(12) United States Patent
Maim

(10) Patent No.: US 11,843,693 B2
(45) Date of Patent: Dec. 12, 2023

(54) METHODS AND ENTITIES, IN PARTICULAR OF A TRANSACTIONAL NATURE, USING SECURE DEVICES

(71) Applicant: Enrico Maim, Sceaux (FR)

(72) Inventor: Enrico Maim, Sceaux (FR)

(73) Assignee: Enrico Maim, Sceaux (FR)

( * ) Notice: Subject to any disclaimer, the term of this patent is extended or adjusted under 35 U.S.C. 154(b) by 216 days.

(21) Appl. No.: 16/464,769

(22) PCT Filed: Dec. 6, 2017

(86) PCT No.: PCT/IB2017/057707
§ 371 (c)(1),
(2) Date: May 29, 2019

(87) PCT Pub. No.: WO2018/104890
PCT Pub. Date: Jun. 14, 2018

(65) Prior Publication Data
US 2019/0394025 A1    Dec. 26, 2019

Related U.S. Application Data

(60) Provisional application No. 62/586,190, filed on Nov. 15, 2017, provisional application No. 62/430,506, filed on Dec. 6, 2016.

(51) Int. Cl.
*H04L 29/06* (2006.01)
*H04L 9/08* (2006.01)
(Continued)

(52) U.S. Cl.
CPC .............. *H04L 9/083* (2013.01); *G06F 21/72* (2013.01); *G06F 21/87* (2013.01); *H04L 9/006* (2013.01); *H04L 9/3247* (2013.01)

(58) Field of Classification Search
CPC ....... H04L 9/083; H04L 9/006; H04L 9/3247; H04W 4/80; G06F 21/72; G06F 21/87; G06F 21/71; G06F 21/57
See application file for complete search history.

(56) References Cited

U.S. PATENT DOCUMENTS 10,521,775 B2 * 12/2019 Hearn ................ G06Q 20/3827
2007/0053513 A1 * 3/2007 Hoffberg ............ G06V 40/103
380/201

(Continued)

FOREIGN PATENT DOCUMENTS

EP    0720326 A2    7/1996
EP    1273997 A2    1/2003

(Continued)

OTHER PUBLICATIONS

International Search Report and Written Opinion in corresponding International Patent Application No. PCT/IB2017/057707 dated Jul. 4, 2018. 26 pages. (Translation attached.).

(Continued)

*Primary Examiner* — Joseph P Hirl
*Assistant Examiner* — Leynna Truvan
(74) *Attorney, Agent, or Firm* — Leason Ellis LLP

(57) ABSTRACT

The invention relates to a secure entity, a trusted execution hardware environment (TEE) comprising a secure processing circuit and suitable for implementing a contract-execution architecture, such as a Wallet Node for executing a contract-type program, wherein said program can be loaded into an execution memory in response to a program identifier contained in a message that reaches the entity via a channel for communication with other entities, and a secure device for interaction with the physical environment of the entity, such as a sensor and/or actuator module, which can supply input data for the execution of the contract and/or receive data generated by the execution of the contract, the (Continued)

secure device containing its own secret key for securing exchanges within the framework of the execution of the program.

15 Claims, 5 Drawing Sheets

(51) Int. Cl.
*G06F 21/72* (2013.01)
*G06F 21/87* (2013.01)
*H04L 9/00* (2022.01)
*H04L 9/32* (2006.01)

(56) References Cited

U.S. PATENT DOCUMENTS

| | | |
|---|---|---|
| 2008/0046752 A1 | 2/2008 | Berger et al. |
| 2008/0192240 A1 | 8/2008 | Tucker et al. |
| 2011/0267190 A1 | 11/2011 | Payson et al. |
| 2013/0036311 A1* | 2/2013 | Akyol ............... H04L 63/08 713/189 |
| 2013/0311791 A1 | 11/2013 | Falk et al. |
| 2016/0359915 A1* | 12/2016 | Gupta ............... H04L 63/20 |

FOREIGN PATENT DOCUMENTS

| | | |
|---|---|---|
| FR | 3035248 A1 | 10/2016 |
| WO | 2016120826 A2 | 8/2016 |

OTHER PUBLICATIONS

Menezes et al. "Chapter 10: Identification and Entity Authentication." Handbook of Applied Cryptography. CRC Press, Inc., West Palm Beach, FL, USA (1997). pp. 385-424.

* cited by examiner

METHODS AND ENTITIES, IN PARTICULAR OF A TRANSACTIONAL NATURE, USING SECURE DEVICES

CROSS-REFERENCE TO RELATED PATENT APPLICATIONS

This application is a U.S. National Stage Application under 35 U.S.C. § 371 of International Patent Application No. PCT/IB2017/057707, filed Dec. 6, 2017, which claims the benefit of priority under 35 U.S.C. Section 119(e) of U.S. Patent Application No. 62/430,506 filed Dec. 6, 2016, and 62/586,190 filed Nov. 15, 2017, all of which are incorporated by reference in their entireties. The International Application was published on 14 Jun. 2018, as International Publication No. WO 2018/104890 A2.

FIELD OF THE INVENTION

This invention relate to the field of methods and systems, in particular transactional methods and systems, involving secure device, and in particular but in a non-limiting manner systems and methods as described in documents WO2016120826A2 and WO2017122187A2 in the name of the applicant, the contents of which are incorporated to the present description by reference.

BACKGROUND OF THE INVENTION

The search reports established for the two above-cited documents constitute the closest prior art.

SUMMARY OF THE INVENTION

The present invention aims at increasing the security and the tampering resistance of entities performing transactions that are desirably secure in a P2P architecture.

It is proposed according to a first aspect a secure entity in a trusted execution hardware environment (TEE) comprising a secure processing circuit and suitable for implementing a contract execution architecture such as a Wallet Node for executing a contract-type program, said program being able to be loaded into an execution memory in response to a program identifier contained in a message that reaches the entity via a channel for communication with other entities, and a secure device for interaction with the physical environment of the entity, such as a sensor and/or actuator module, which can supply input data for the execution of the contract and/or receive data generated by the execution of the contract, the secure data containing its own secret key for securing exchanges within the framework of the execution of the program.

This entity optionally comprises the following advantageous features:

- the entity comprises at least one detector device capable of detecting the normal/abnormal status of an environment parameter of the secure processing circuit, the or each device comprising a secret private key making it possible to sign normal/abnormal status information for the device in question, the secure processing circuit being able to transmit messages containing, on the one hand, message content signed with a private key of the circuit, and on the other hand, the or each piece of normal/abnormal status information signed with the corresponding private device key.
- the entity comprises at least two detector devices capable of detecting the normal/abnormal status of at least two different environment parameters of the secure processing circuit, each detector device receiving the normal/abnormal status information signature of at least one other detector device and comprising a processing means at least to verify said signature.
- the processing means is capable of generating normal/abnormal status information of the other detector device, signed with its own private key.
- a lack of status information to be supplied by a device corresponds to an abnormal status of said device.
- the or each environment parameter is chosen from a group comprising the operating parameters of the secure processing circuit and the integrity of an envelope surrounding the secure processing circuit.
- the entity comprises at least two detector devices, including one for an operating parameter and another for the integrity of an envelope, wherein the envelope also surrounds the detector device of the operating parameter.
- the entity comprises a detector device capable of detecting the normal/abnormal status of the integrity of an envelope surrounding said secure processing circuit, wherein said envelope also surrounds said secure interaction circuit.
- the entity further comprises a normal/abnormal status detector device of the secure interaction circuit.
- the entity comprises at least two envelopes respectively surrounding at least two separate units of the entity, and in one of the units, a normal/abnormal status detector of the integrity of the envelope of another unit.
- the signed normal/abnormal status information is generated periodically in order to be sent remotely to at least one verifying device and in order to verify the continuity of a normal status, the secure processing circuit being able to store the latter locally in order to address any unavailability of a remote communication means between said secure processing circuit and said verifying device and to send the latter the set of missing signed status information once the communication means is reestablished.
- the verifying device is a device of a central authority.
- said at least one verifying device comprises a set of verifying devices formed by circuits implementing mirrors with respect to the secure processing circuit.
- the entity further comprises a means for neutralizing the secure processing circuit in case of detection of an abnormal status.

It is proposed according to another aspect a method for securing exchanges between entities in a P2P architecture, each entity comprising a secure processing circuit such as a WND and at least one detector device capable of detecting the normal/abnormal status of an environment parameter of the secure processing circuit, the or each device comprising a secret private key making it possible to sign normal/abnormal status information for the device in question, the secure processing circuit being able to transmit messages containing, on the one hand, message content signed with a private key of the circuit, and on the other hand, the or each piece of normal/abnormal status information signed with the corresponding private device key.

This method optionally comprises the following advantageous features:

- it is implemented in an entity comprising at least two detector devices capable of detecting the normal/abnormal status of at least two environment parameters of the different circuits, each detector device receiving the normal/abnormal status information signature of at least one other detector device and comprising a processing means at least to verify said signature.

the processing means generates normal/abnormal status information for the other detector device, signed with its own private key.

an absence of status information to be provided by a device corresponds to an abnormal status of said device.

the or each environment parameter is chosen from a group comprising the operating parameters of the circuit and the integrity of an envelope surrounding the secure processing circuit.

it is implemented in an entity comprising at least two detector devices, including one for an operating parameter and the other for the integrity of an envelope, wherein the envelope also surrounds the detector device of the operating parameter.

it is implemented in an entity comprising a sensor and/or actuator module, wherein a device for the integrity of an envelope, the envelope also surrounds said module.

it is implemented in an entity further comprising a normal/abnormal status detector device of at least one sensor and/or an actuator.

it is implemented in an entity comprising at least two envelopes respectively for at least two units separate from the entity, wherein an environment parameter comprising an integrity of the envelope of one of the units is detected by a detector device of another unit.

the signed normal/abnormal status information is generated periodically for remote transmission to at least one verifying device and for verification of the continuity of a normal status, the secure processing circuit being able to store the latter locally to address any unavailability of a remote communication means between said secure processing circuit and said verifying device and to send the latter the set of missing signed status information once the communication means is reestablished.

the verifying device is a device of a central authority.

said at least one verifying device comprises a set of verifying devices formed by circuits implementing mirrors with respect to the secure processing circuit.

the method comprises an initial pairing of the entities comprising sending a normal/abnormal status signature generated by a detector device from one entity to the other entity, and reciprocally, and the verification by each entity, during an interaction with the other entity, that its normal/abnormal status signature reveals a normal status.

the direct pairing involves biometric data, said biometric data being used to limit the possible number of pairs of public/private keys per individual in the network.

the pairing comprises at least one technique chosen from among an exchange of biometric data, an exchange of random codes generated at each device, the generation of a shared physical code (e.g., shock).

the method further comprises the neutralization of the secure processing circuit if an abnormal status is detected.

It is proposed according to another aspect method for determining the origin of a fraud in a network of entities in P2P where each entity has a secure processing circuit such as a WND and a detector device capable of detecting the normal/abnormal status of an environment parameter of the circuit, comprising:

determining a flaw in the information generated by an entity, determining a normal or abnormal status at the detector device of said entity, neutralizing said entity in case of abnormal status, propagating flaw information without breach of said entity toward the network in case of flaw in said information despite a normal status.

Advantageously but optionally, the flaw information without breach comprises information on the device manufacturer in order to neutralize all of the devices from said manufacturer.

It is provided according to still another aspect a portable terminal comprising a security envelope, the envelope comprising a means for capturing a signal transmitted by a generator of the terminal (screen, speaker, etc.), a means for conveying this signal in the envelope, and a means for retrieving said signal at a sensor of the terminal (camera, microphone, etc.), and a means provided in a processing circuit connected to the generator and the sensor for detecting a breach of this envelope by alteration of the retrieved signal.

Advantageously but optionally, the conveying means comprises a plurality of channels capable of conveying the signal, distributed in the envelope.

It is proposed according to still another aspect a pairing method between entities in P2P on several levels, each entity comprising a secure processing circuit and, if applicable, at least one sensor and/or actuator module, with direct pairing (level 0) requiring proximity between entities and indirect pairing where entities already paired with a second entity become paired indirectly (levels 1 and more) with the first entity by transfer of a neighborhood comprising information designating said entities already paired with the second entity, when the first and second entities are subject to a direct pairing, and at least some entities being protected by a detector device capable of determining the normal/abnormal status of an environment parameter of the processing circuit and if applicable of said module, the method comprising the transmission between entities of normal/abnormal status information provided by their detector device(s), and the transmission of a neighborhood by an entity to another entity only if said normal/abnormal status information indicates a normal status for the transmitting entity.

Advantageously but optionally, only one neighborhood meeting a given criterion regarding population of entities protected by detector devices can be transferred to an entity in the context of a direct pairing.

It is also proposed a pairing method between devices capable of sending and receiving encoding signals transmitted in proximity, a first device sending a signal encoding a nonce captured by the second device while at the same time, the second device sends a signal encoding a second nonce captured by the first device, said nonces being used to generate a shared ephemeral symmetrical key to secure the exchange between the devices of other data connected to the pairing.

Finally, it is proposed a pairing method between devices capable of sending and receiving encoding signals transmitted in proximity, a first device transmitting a signal encoding a nonce captured by the second device while at the same time, the second device sends a signal encoding a second nonce captured by the first device, said nonces being used to reciprocally send one another their public keys in order to secure the exchange between the devices of other data related to the pairing.

BRIEF DESCRIPTION OF THE DRAWINGS

Other aspects, aims and advantages of the invention will better appear from the attached Figures.

The drawings of WO2016120826A2 and WO2017122187A2 as well as of the other applications mentioned in Chapter VI below shall be considered as part of the present drawings.

DETAILED DESCRIPTION OF PREFERRED EMBODIMENTS

I—Envelope Signature

Now will be describe a number of possible embodiments for a device protecting against physical attacks of a circuit having its own logic protection (for example the "Trusted Execution Environments" (TEE) or "Wallet Node Devices" as described in WO2017122187A2), intended to provide one or more functions or transactions securely, or any combination of circuits to be secured.

Figure 1:
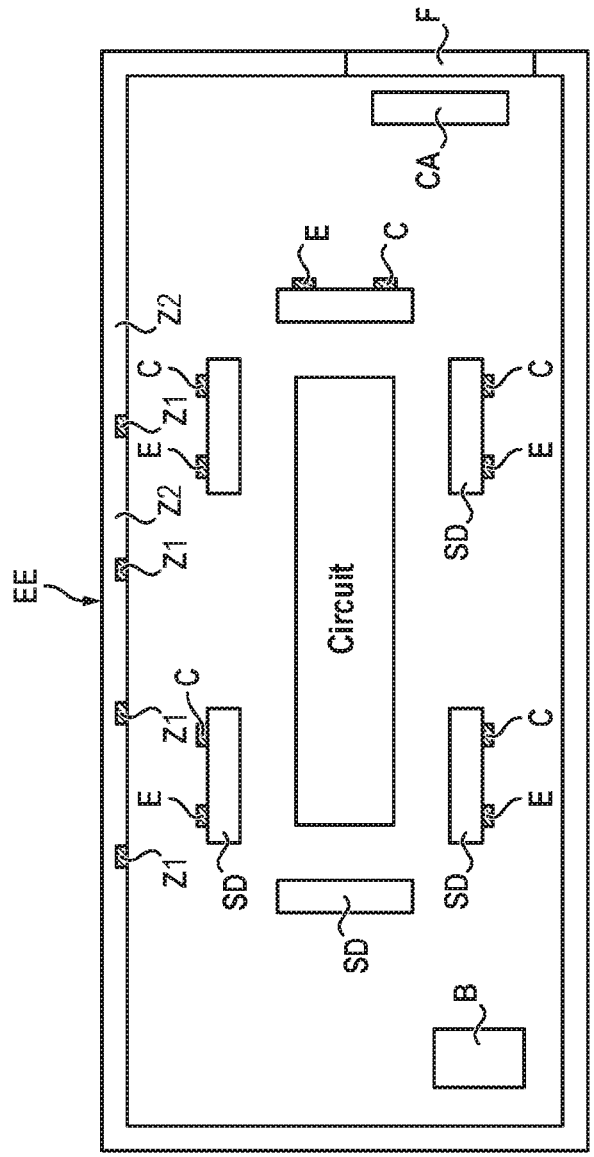
FIG. 1 is a diagrammatic cross-sectional view of a circuit equipped with a secure envelope and tampering detection means.

In a first approach, and with reference to FIG. 1, the device implements an outer envelope EE which is preferably essentially continuous, surrounding the circuit to be protected and having certain unique properties.

These unique properties can be materialized for example by:
- the presence in certain areas Z1, in the mass or in coating, of a material different from the material of the other zones Z2, this different material being able to be detected in particular by its properties in response to a certain radiation;
- in a practical embodiment of the above principle, the presence of a unique, optically readable pattern, the material being typically an ink;
- the presence in certain zones of a surface treatment (roughness, etc.), this treatment being detectable in particular by its properties in response to a certain radiation.

This pattern can be predefined or randomly generated, so as to be unique to a given circuit.

Radiation here preferably means electromagnetic radiation ranging from radio waves to the waves of the visible range and even up to the infrared.

Nevertheless, certain embodiments, especially when the size of the envelope increases, may involve acoustic waves, for example ultrasonic waves.

The treatment of the shell material exposed to this radiation is determined according to the nature and the wavelength of the radiation: for example metallized zones vs. non-metallic, reflective vs. absorbent, reflective vs. diffusing.

Moreover, the envelope, intrinsically or thanks to a specific treatment after its manufacture, may include windows F, namely zones that are transparent with respect to a certain type of radiation, in particular enabling sensors (optical sensor of the type camera CA or other, antenna, sound or ultrasonic sensor, etc.) to be able to capture the radiation in question coming from outside, and/or allowing sources of such radiation to transmit towards outside.

The device further comprises an internal detection structure SD in one or more parts extending inside the envelope EE and capable of scanning this envelope and generating a signal intended to be signed with a private key of the circuit to testify to the non-alteration of the envelope.

This detection structure comprises in one embodiment a circuit having one or more transmitters E of radiation in combination with one or more sensors C, organized for example in a matrix or in a modular manner, this circuit being able to communicate in a secure manner with a cryptographic part of the circuit to be protected, which will perform the signature of the supplied signal with the aforementioned private key.

The device is powered either by a dedicated battery B housed inside the envelope, or by the battery, also internal, which feeds the circuit C.

In a particular embodiment, the transmitters transmit signals that are reflected or scattered or absorbed by the different materials or coating on the inner face of the envelope, and the sensors receive the return signals.

It is understood that to a given pattern of the envelope E will correspond a unique configuration of collected signals, and that if the pattern has been moved or altered, the collected signals will also be altered.

Preferably, in the case of several sensors, the signals that they output are combined (analog or digital combination, for example by multiplication, multiplexing, etc.), and the global signal formed, called envelope signal, is signed using the private key of the circuit, to form a unique envelope signature (hereinafter ES) corresponding to an intact envelope.

In the case where the sensor or sensors deliver analog signals, means for processing (amplification, filtering, etc.) and for analog/digital conversion are associated thereto in a manner known per se so as to obtain a digital signal.

This digital signal is subjected to a hash function, the hash being then encrypted with a private key of the circuit and stored (or dynamically regenerated by PUF process—Physical Unclonable Function—see explanations on https://en.wikipedia.org/wiki/Physical_unclonable_function) therein in a manner inaccessible from the outside, to obtain the envelope signature.

To this private key is associated a public key certified by the manufacturer of the circuit or of the entire device, wherein this public key can be used by other devices to check the origin and the hash of the envelope signal.

In another embodiment, the one or more sensors directly deliver a digital signal, the digital signals of the various sensors being combined (for example concatenated), and the hash of this combination being encrypted with the private key as mentioned above to generate the envelope signature.

It should be noted that the pattern incorporated in the envelope may be designed to allow detecting not only mechanical attacks on the envelope, inevitably inducing alteration or displacement of the pattern, but also attacks through the envelope (e.g. "Focused Ion Beam", etc.)

Also advantageously, the envelope also provides protection at the power supply conductors of the circuit, so as to avoid a fraud attempt involving a power failure.

The detection structure has its own drivers for the transmitter(s) and the sensor(s), and communicates with the circuit to be protected according to a suitable protocol.

The envelope signal is generated either regularly on the initiative of the circuit to be protected or on the initiative of the detection structure SD (which is then clocked by its own clock), or on request of the circuit to be protected.

In an embodiment, the envelope signal can be combined with time-stamp information before being signed.

In an embodiment, a log of the envelope signal—possibly time-stamped—is recorded in an ad hoc protected memory accessible by the circuit to be protected, the recording preferably taking place after signature.

It is possible to provide an operation of the circuit to be protected in self-protection. In this case, said circuit self-neutralizes as soon as it has detected that the envelope signal has been altered by an intrusion attempt. The circuit can also send an alert message to one or more other devices, to add a degree of security in the event that the self-neutralization mechanism would have been bypassed.

The recording of the time-stamped envelope signatures in a log also makes it possible to detect a temporary power failure of the circuit. Indeed it will then be impossible to reconstitute a posteriori the previous signatures of the time-stamped envelope signal.

In an alternative embodiment, the pattern "registered" in the envelope may constitute an auxiliary memory for certain data relating to the circuit. For example, this pattern may also constitute an identifier of the circuit. In this case, the envelope signal constitutes an identification signal of the circuit.

In addition, the circuit to be protected may belong to a device in an environment where devices are paired with each other (for example SoCs or "Wallet Node Devices" as described in WO2016120826A2 and WO2017122187A2), for example by forming neighborhoods (see below).

When pairing between devices, the respective envelope signatures are mutually communicated and stored, and it is provided that on subsequent interactions between paired devices, the envelope signatures will be transmitted again. A second device paired with a first device is thus capable of determining by comparing the current hash with the cutoff communicated during the pairing, that the envelope of the first device has not been altered, and conversely.

On this occasion, if the envelope signal has been supplemented by time-stamp information at the source device, the recipient device can also after decryption determine if the time-stamp information contained in the message in association with the envelope signal is normal.

Figure 2:
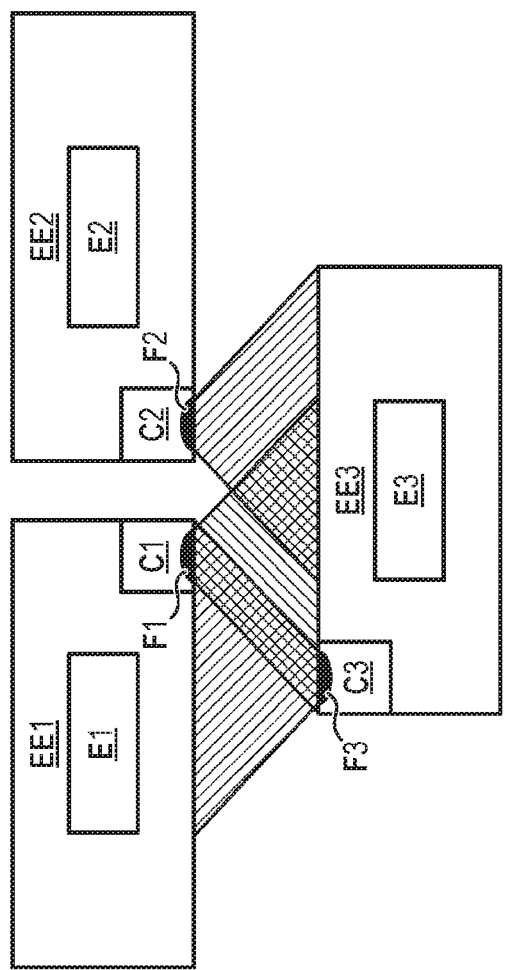
FIG. 2 is a block diagram of a set circuits capable of mutually monitoring their secure envelopes.

The envelope signature mechanism as described above can be implemented in different ways:
  it is thus possible to house in the same envelope a set constituted by a main circuit (implementing for example a wallet node) combined with one or more sensors and/or one or more actuators as described in the patent application U.S. 62/430,506 filed on 5 Dec. 2016, and whose content is incorporated herein by reference.
  alternatively, and with reference to FIG. 2, each of these elements E1, E2, E3 can have its own envelope EE1, EE2, EE3 as described in the above. In this case, each element can monitor its own envelope from the inside, but each element can also have one or more sensors C1, C2, C3 operating through one or more windows respectively F1, F2, F3 of its own envelope and capable of monitoring the envelope of a neighboring element. An envelope will thus have a unique "internal" envelope signature, and one or more unique "external" envelope signatures established by elements (sensors, actuators, wallet node circuit, other circuits, . . . ) fixedly located in the vicinity.

Under these conditions, if one attempts to tamper one of the elements, it would be required to simultaneously tamper the neighboring element or elements that monitor the envelope of the element in question to neutralize them. This requirement of a simultaneous tampering on two or more elements of a same set makes any fraud impossible.

The monitoring of a circuit envelope from the inside or the outside can be supplemented by the monitoring of environmental parameters of the considered circuit or of its neighbor (s) (temperature, clock frequency, etc.).

Other embodiments of an envelope having a unique signature are possible.

1) Flexible Envelope

An envelope may be made of a thin material having a certain plastic deformation capacity, its application around a circuit involving efforts that lead it to adopt a unique geometric configuration for each circuit. The scale at which the shapes are different may vary. A detection structure based on the emission of radiation in the range of visible or near invisible (UV for example) allows detecting by means of appropriate optical or UV sensors (for example by detection of interference patterns) micrometric variations in the shape of the envelope, each envelope having a unique signature.

In a particular form, this envelope may be made of a deformable UV-hardenable resin provided on its inner surface with a film in a thin layer, for example a metal layer (at the same time providing an electromagnetic shielding) capable of reflecting the radiation transmitted towards it by the detection structure. Micrometric differences in the shape of the envelope and thus of the thin layer will generate detection configurations by a set of optical sensors which are in each case unique.

2) Alternative Approaches from Existing Art
  a) Patent US2011267190A1: a transmitter located internally to a security envelope of the circuit transmits an RF signature which is reflected by the inner face of said envelope, the reflected signal being picked up by a receiving antenna; if the envelope has been altered, the reflected signal no longer conforms to the expected signal and a physical attack is thus detected;
  b) U.S. Pat. No. 9,059,189 B1: Integrated circuit provided inside its housing with a radio frequency (RF) transmission/reception system capable of generating a particular signature in the time and frequency domains, the RF signal and therefore the signature being altered in case of abnormal conditions;
  c) U.S. Pat. No. 9,455,233B1: a circuit is surrounded by a micro-mesh of conductive wires that allows the detection of a tampering attempt by "micro-probing";
  d) U.S. Pat. No. 9,661,747B1: flexible security envelope layer with patterns made with a conductive ink, and associated detection means;
  e) Patent US2007175023A1: flexible circuit packaging cooperating layers of security "trace" having conductive patterns for example serpentine;
  f) Patent US2007234058A1: authentication of a product by comparing a so-called "laser speckle" pattern with a reference pattern; if the product has been tampered (counterfeit), the signature no longer matches;
  g) Patent US2013104252A1 or US2016211843A1: use of a lattice of conductive wires carrying a variable digital code;
  h) Patent US2015097572A1: envelope provided with a network of conductors with variable configuration of contacts generated during manufacture, unique for each circuit;
  i) Patent US2017135237A1: flexible envelope with conductive patterns and creation of overlapping zones when applying it to a housing;

j) Patent WO2017050910A1: variable configurations of an array of electrically connected cells, each having a unique characteristic impedance;

k) article under the link http://www.informit.com/articles/article.aspx?p=328170&seqNum=3 which describes a number of techniques to prevent access (mechanical, electrical or even optical) to a circuit to be protected.

3) Acoustic Approaches

It is possible to transpose the principles of some of the above patents to the world of acoustic waves (typically ultrasonic waves), the envelope incorporating in this case channels capable of conveying the acoustic waves in a directional manner, and a break in the continuity of the envelope causing an interruption in the conduction of acoustic waves from a transmitter to a receiver.

4) Envelope for Commercial Device

The invention can also be implemented with electronic devices consisting of devices such as smartphones.

In this case, a secure envelope surrounds at least part of the smartphone (at least the part that would necessarily be opened to physically alter the content of the smartphone).

This envelope is designed to convey in a unique way signals between a transmitter transmitted from the smartphone and a receiver also located in the smartphone.

For example, the shell can be arranged to be in acoustic communication with the speaker of the smartphone and with its microphone, and to convey uniquely (for example with a unique frequency response profile, by choice of a configuration of shell material) a certain acoustic signal generated within the smartphone and transmitted by the loudspeaker, towards the microphone (the acoustic waves being propagated in the mass of the shell, for example in the form of surface waves).

If the signal picked up by the microphone does not have the expected characteristics, it means that either the shell has been removed or it has been altered to access the inside of the smartphone.

A similar principle can be implemented with optical signals transmitted by the smartphone display screen (partially optically coupled with the shell) and collected by a smartphone camera (here again partially optically coupled with the shell).

Figure 3A:
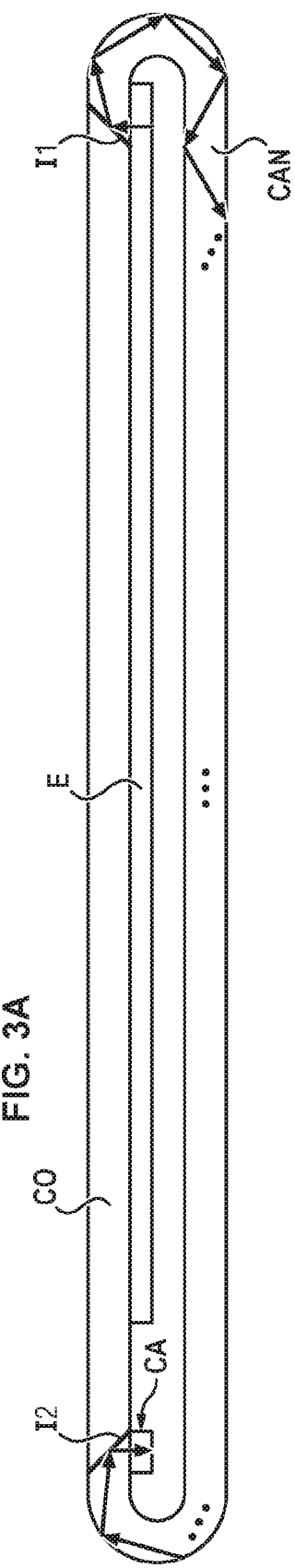
FIGS. 3A and 3B illustrate in cross-section and in plan view a smartphone-type terminal equipped with a certain form of a secure envelope.
Figure 3B:
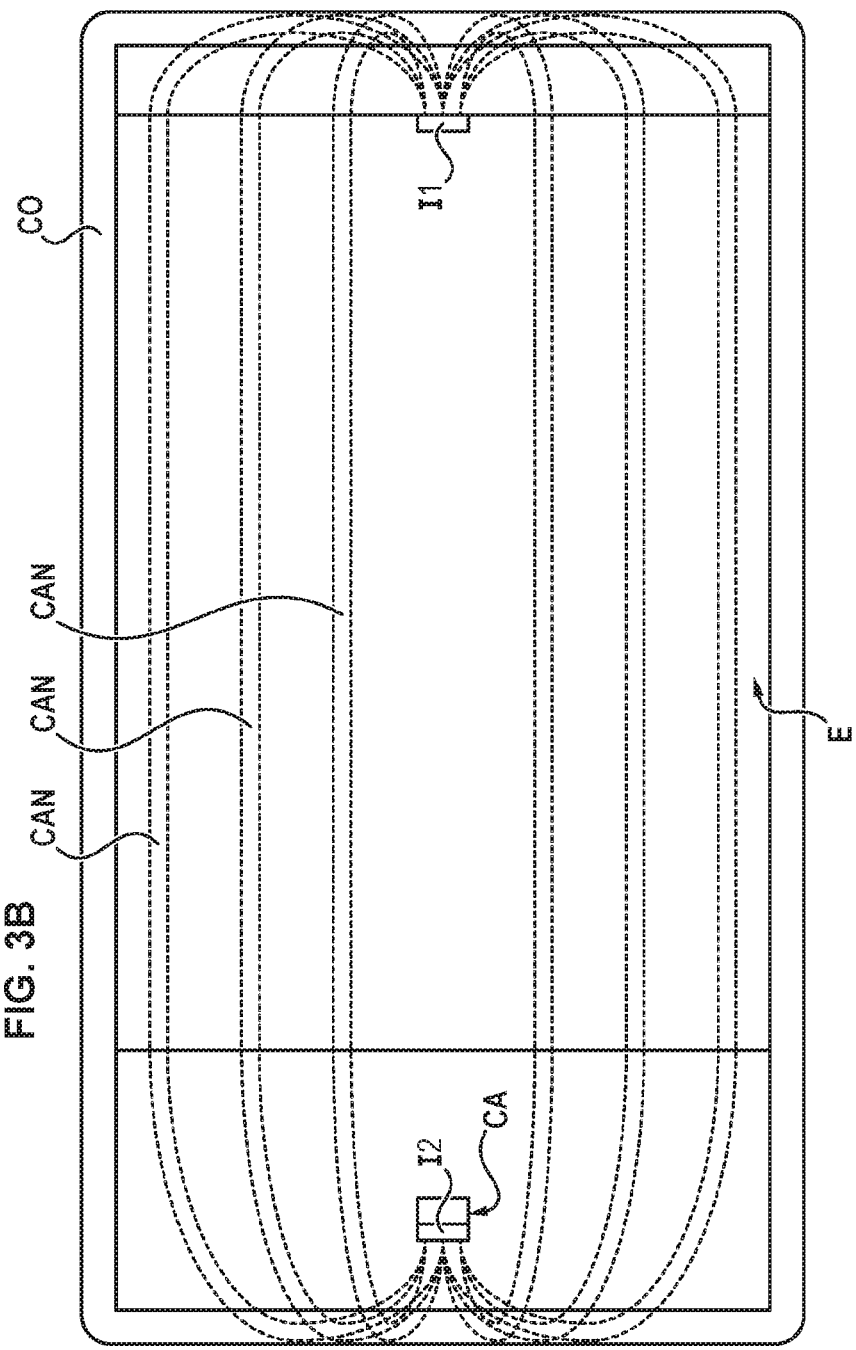

An example of propagation of the optical signals in the shell is diagrammatically illustrated in FIGS. 3A and 3B.

Within the shell CO is an internal reflection interface I1 with regard to a particular zone of the display screen E, for example a small lateral zone covering a few pixels and another internal reflection interface I2 with respect to a particular area of the camera CA, or else (to avoid cluttering the field of view of the camera) a diffusion interface distributing the optical signal on the optics of the camera. It will be noted here that the control of the camera CA can be designed either to take pictures only during periods of absence of the optical signal. Alternatively, the diffused optical signal may be sufficiently weak not to significantly disturb the images taken by the camera CA.

It is thus possible to transmit, by control of the display, an optical signal with intensity modulation and/or spectral variation over time (preferably a single signal for each smartphone), which propagates after internal reflection on I1 in the shell until the interface I2 and thus up to the camera CA.

This signal travels the entire periphery of the smartphone by being for example distributed in a set of optical channels CAN forming a network of parallel lines, a mesh, etc. If one of the channels is interrupted due to tampering on the shell, then the overall intensity received at the camera is lowered, and/or the spectral characteristic of the received signal is altered, a component, and this tampering is thus detected.

In the case where such a shell is accidentally fractured, the envelope signature is altered, and the circuit is no longer considered reliable. A new pairing with a new shell is then necessary.

II—Interactions Between Devices

Documents WO2016120826A2 and WO2017122187A2 describe in particular:

methods allowing a decentralized identity in a P2P network and

Wallet Node Device (hereinafter WND) systems—called Body SoC or Body Enclave—hosting Wallet Nodes (WN) executing Wallet Programs (WPs, "smart contracts") on interaction protocols, in particular for transfer of tag-values—called Tags—(such as Bitcoins), between WN, implementing mirror WNDs.

The methods and systems described in this chapter extend or are variants to those already described and aim to make them more reliable.

First will be described a new family of methods of decentralized identification of nodes forming a peer-to-peer network, before describing the hardware means and a protocol to take advantage of the decentralization at the WND manufacturers' level.

Conventionally, each node generates locally (for example in the browser) a pair of cryptographic keys (private/public) and associates thereto attributes (such as the name of the individual that the node represents) that characterize it. The keys are used to (i) identify the node, possibly by generating the node address on the network from the public key (typically, it is the hash (or hash of the hash . . . ) of the public key) (ii) to encrypt the transmitted contents (with the public key of the recipient, wherein the recipient decrypts them with his private key) and (iii) to sign them (with the private key of the sender, wherein the recipient verifies the signature with the public key of the sender).

1) Pairing—Public Key Exchange

To form a link in the network (that is, to be "directly connected") two nodes (devices) must be paired, i.e. exchange their respective public keys, as well as attributes associated with each key, which are to be validated by the destination node (the recipient thus recognizes the attributes associated with the key), by using a protocol among a set of secure protocols that are available to them (depending on the technologies available in the devices—see the pairing processes described below).

It should be noted that the devices themselves must be logically secure—see the description of the WNDs in the aforementioned applications.

This pairing is preferably done with a protection against a "Man-in-the-middle (MitM) attack": it is preferably a public key exchange during a physical meeting, or remotely but in a specially secured way. Note that in the following, when the transmission (or exchange) of public keys is mentioned, it is meant transmission (or exchange) of public keys or addresses. Also note that, although a link (authentication link) between two nodes is not necessarily bidirectional, hereinafter to facilitate the reading of the text only the exchange of public keys bidirectionally is described—wherein the methods described herebelow can be executed unidirectionally (the reader can easily understand them in this meaning).

These public keys thus exchanged make it possible to encrypt the attributes and thus transmit them in a secure manner (see also the protocols described below which propose in addition means for transmitting data encrypted by symmetrical key). And the knowledge of public keys, and associated attributes, spreads via the vicinity (see the section Neighborhood of a node).

The verification of the authenticity of a received public key is carried out as follows.

First of all, it is already known to check that there has been no digital identity theft: conventionally, a user A sends a nonce (random number for a single use) to a user B; the user B signs the nonce and this signature can be verified by A decrypting it with the public key of B. This therefore allows eliminating a user B' who knows the public key of B and tries to impersonate his digital identity.

Figure 4:
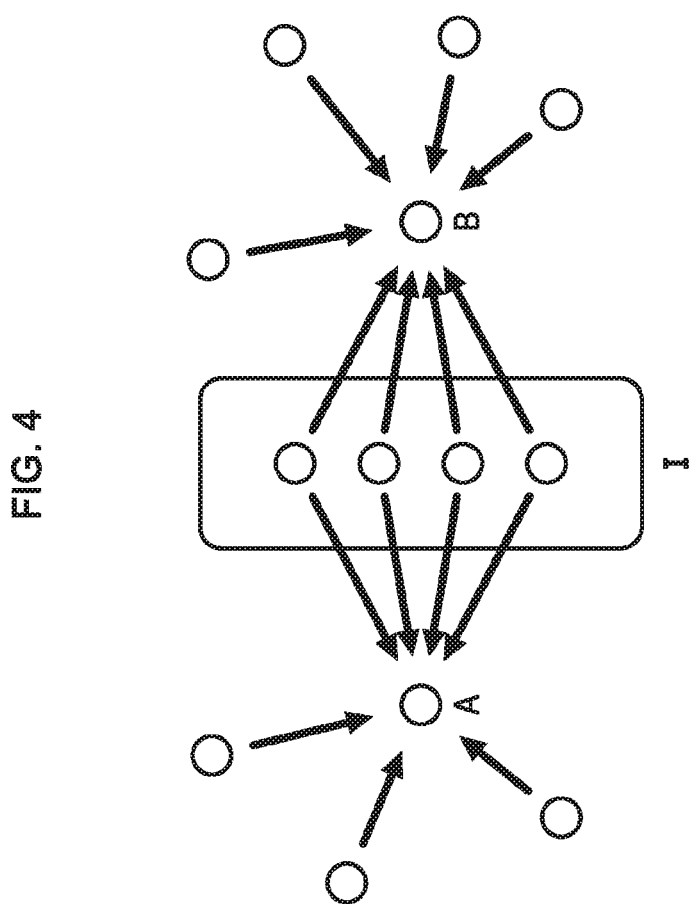
FIG. 4 illustrates a mutual authentication of nodes of a network with attribute transmission.

Secondly, when a node transmits its attributes to another node, it receives in return a confirmation that these attributes actually characterize it. Thus, for two nodes to authenticate each other, it suffices that they have confirmations of their attributes by a sufficient number of nodes in common. FIG. 4 shows that the nodes "A" and "B" mutually authenticate each other because the intersection "I" of the respective sets of nodes from which they have received confirmation of their attributes is sufficiently large (this intersection comprises 4 nodes in the figure—note that in general the exchanges and confirmations of attributes are done in both directions, but this is not shown in FIG. 4 in order to focus on the process in question). Advantageously, the authenticating node will accept in the set "I" only the nodes having attributes that it has itself confirmed. Alternatively, this same approach can be used to implement the authentication in each direction separately: thus to authenticate the node "B" of the figure, the node "A" must have confirmed the attributes of a large enough number of nodes (which can to be seen here as forming the set "I" of the figure) which in turn confirmed attributes of the node B of the figure. In addition, methods for determining connection weights or attribute scores can be used, certain of which being described in the first part of the text, these methods allow to authenticate more widely, the requirement of nodes in common (i.e. the intersection "I") being made less strict by also accepting a sufficient number of different nodes but strongly connected to each other or having high scores depending on the authenticating node.

Finally, before accepting a new node in the network or in the case where there is not a sufficient number of confirmations by nodes in common (or strongly connected to each other), it is necessary to use a protocol such as those described below (and which are analogous to the "IRL-connection" processes) to transmit keys and attributes in a secure way (to mitigate the risk of MitM attack).

2) Pairing—Capturing and Returning Signals Locally

To further secure a pairing, it is proposed here techniques for capturing and returning signals randomly and locally generated on both sides by at least two devices (typically smartphones) that are in close physical proximity to each other. (These signals can be for example a flash display of a certain optical pattern, for example a QR-Code, on a device and a snapshot of this pattern by the camera of the other device, in a mutual way), the devices communicating then in an encrypted manner between them using these signals in order to mitigate the risk of MitM.

Advantageously, the method comprises a handshaking protocol for setting the moment(s) of presentation/capture of the signal (or signals).

In the particular case of an embodiment using optical signals, two devices provided with optical reading means (such as two smartphones, using a given app) are coordinated according to an optical handshaking protocol (by displaying codes such as QR-Codes, according to predetermined rules, based on codes read from the other device), to determine the precise moment when they must take said snapshot, and present to each other (by flash display at this precise moment) an optical code generated randomly and serving only once, wherein the devices at this precise moment must be typically placed in a predetermined position relative to the other (typically, each must face the other) so that the displayed code can be read completely.

The captured code may alternatively consist of a sequence of optical signals.

Analogous methods can be implemented with signals of other types, for example infrared coding signals, coding radio signals, coding acoustic signals. In the latter case the microphone of a smartphone must be close enough to the speaker of the other smartphone, and vice versa, to avoid the impact of ambient noise.

Whatever the vehicle of the signals, each device thus transmits, in a short-range relation, a nonce to the other device, these exchanged nonces allowing, by encrypting the communications using the contents of the nonces, each device to ensure that it is the device with which the pairing is desired which transmits.

The capture of these nonces being performed on both sides, the data transfers between devices are then performed according to at least one of the following methods:

in a first case, the data transfers between the devices are performed after having (i) generated a (at least one) symmetric key from the nonces, key that the devices must keep secret) and (ii) after having encrypted with this key other data to be transmitted; thus, in the optical case, a symmetric key is generated from a combination of said optically readable codes that have been presented on both sides. Advantageously, this symmetric key is ephemeral (it is only used for data transmission just after its generation and is no longer valid later);
 in a second case, where the devices each generate a pair of public/private keys, the public keys are exchanged first, accompanied by signatures decryptable using these keys, wherein the content of said signatures includes a portion generated from the captured nonce to prove that the key in question was not transmitted by a MitM, which the respective recipients verify (by decrypting the signature and verifying the part generated from the captured code), then the data transfers from each to the other are done in a secure way by encrypting them (only or in addition) with the public key of the other. Here again, advantageously, the validity of the code captured in the signature is ephemeral.

When the devices are able to communicate directly by NFC or similar means, the keys are exchanged between the devices directly (without going through a network). In the opposite case, the fact that the data is encrypted (by symmetric key or by the respective public keys, as described above) also guarantees the security of the transmission during transit via non-trusted nodes of the network or via an non-trusted intermediate server.

3) Pairing with Biometric Data

In addition to the pairing with nonces transmitted in proximity according to point 2) above, it is possible to implement a capture of biometric data on both sides.

To describe a particular case, consider an embodiment with fingerprint capture: each device captures a fingerprint of the user of the other device (hereinafter referred to as "the other user") as well as of its own user (called "the user") and the fingerprints captured allow here to generate the respective canonical (reproducible) forms thereof.

(The computation of the canonical form of fingerprints is known: the researchers Senior and Bolle proposed in 2001 a canonical form on the basis of a representation where all the ridges are equally spaced and the ridge lines are approximated by spline curves, the recognition being based on the deviation from a mean distance between ridge. Then other researchers have proposed even more elaborate canonical forms, including Lee, Choi and Kim in 2002, Lorch, Morguet and Schroeder in 2004, Bhowmick and Bhattacharya in 2004, and Ross and Nadgir in 2008).

In general, it is known to generate a canonical form for practically all types of biometric data.

It is proposed according to this aspect, from a canonical form of biometric data (of any type) captured on both sides by devices of users who meet physically, such as smartphone, laptop, etc., to use the general method described above by including, within the exchanged signed contents, data generated according to pre-established rules from the canonical form of the biometric data.

Of course, as also described above, biometric data captures can be done in sequence.

The combination of the use of a nonce mutually captured by a mode of transmission in proximity, leading to a symmetric key and therefore to an ephemeral signature, makes it possible to protect oneself from a "replay" of the exchange of biometric data by a fraudster.

Advantageously, the canonical forms of transmitted biometric data are in themselves attributes (which, as described above, are confirmed on both sides and are associated with the respective public keys). Steps of transmission of biometric attributes may also possibly be provided to corroborate the respective biometric data captured.

4) Pairing with Kinematic Data

The approach here is as follows: the devices generate a symmetric encryption key from (in particular) high-definition common kinematic data produced during a physical contact (shock) between them and undisclosed, wherein these data can typically come from an accelerometer or an inertial unit of each device.

Other information (GPS signals, clock signals, optical signals picked up by the camera, acoustic signals picked up by the microphone, NFC signals, etc.) can also be used in combination with kinematic data.

The data (kinematic alone or combined) is used to generate an ephemeral symmetric key for encrypting non-common data to communicate between the devices—such as their respective public keys. Alternatively the devices first transmit to each other their respective public keys but with a signature of the common data (from the respective accelerometers, etc.) that they alone know, thus proving that the public key in question does not come from a MitM, wherein this communication can thus be done without risk especially via a non-trusted network (or non-trusted intermediate server).

More specifically, two terminals (such as modern smartphones, using a given app) each having previously generated a pair of keys are in brief physical contact (shock) and their accelerometers measure the shock produced by this contact which causes the same measure (with opposite signs) on both sides, that only these devices know.

This common data, as well as possibly other common data including for example the geolocation and the precise moment of the shock, are used to generate a symmetric encryption key (from common data that only the terminals know).

Non common data can then be encrypted with this symmetric key locally (for example, at the application level, in each smartphone) and transferred between the two devices (even via a non-trusted network, for example via a server, wherein this server cannot see the data transmitted). In particular, each device can generate a private/public key pair, and the public key, as well as a signature that can be decrypted with it, are encrypted with this symmetric key and then transmitted (advantageously, the signed content may include said common data). Here again, advantageously, the validity of this symmetric key is ephemeral.

Alternatively, the two devices each generate a private/public key pair and each public key is transmitted to the other device (preferably directly by NFC or another appropriate communication channel, or via a non-trusted network), at the same time as the signature (that can be decrypted by this public key) of the hash of the common data that they alone know (to prove that the key in question was not transmitted by a MitM), which the respective recipients verify (by decrypting the signature with the received key and by checking the common data). Other non-common data can then be transmitted in an encrypted manner with the recipient's public key. Here again, advantageously, the validity of said common data contained in the signature is ephemeral.

To summarize, either the devices generate a symmetric key encryption from common data of adequate accuracy produced during a physical contact between them and undisclosed, obtained from the accelerometer of the device and/or the clock, the GPS, etc., and use this symmetric key to encrypt non common data (that they communicate to each other in encrypted form), or the devices transmit their respective public keys with a signature of (whose signed content includes) common data, proving so that it does not come from a MitM.

Other MitM attack protection methods are described in the aforementioned WO2016120826A2 and WO2017122187A2 applications and the devices can use them as fallback positions when they are not equipped with the required technical means (screen, camera, fingerprint sensor, accelerometer . . . ) or when they meet only virtually (in these applications is then proposed a process called "out-of-band channel", as orally, to transmit a passphrase and receive back the hash within a signed content that can be decrypted with the received public key).

III—Protection of a Group of Devices Against "Sybil Attacks"

Insofar as two devices accurately perform one of the methods described above (or described in one of WO2016120826A2 and WO2017122187A2 documents), not only are their users protected from a "MitM attack" but also, as it will be seen now, they can be protected from a "Sybil attack".

The principle is as follows: if a user U1 meets one by one (individually, physically or by an "out-of-band channel") other users U2 . . . Un, (i.e. the respective users of the other devices from which his device receives public keys as described so far), then the user U1 can ensure that the majority of the keys he receives are actually those of the other users from whom he receives them, and are not keys part of a profusion of keys controlled by an opponent (exact definition of the Sybil attack).

In particular, if the majority of these keys is indeed "non-Sybil", the redundant interaction method between WNs via mirror WNDs (described in WO2016120826A2 and WO2017122187A2) then guarantees to it that, if it trusts a single manufacturer or if the respective manufacturers of mirror WNDs are sufficiently different (see below the "three-level protocol"), the WNs with which it interacts (in particular those at the leaves of the uptree (already described above) of a transaction from which it receives tag-values such as Bitcoins) are reliable, that is to say they respect their commitments with respect to the executed smart contracts (in particular they do not double spend).

To this end, the user must ensure that the other user (whom he meets individually) sends him a single public key (representing his identity) or, at most, a limited number of public keys (representing different identities for this same individual), wherein this restriction can depend on the manufacturers of the other devices from which it has received keys, (in particular manufacturers of the WNDs that mirror its WN,) in order to guarantee a diversity of the manufacturers (at least manufacturers of its mirror WNDs), or depend on still other factors.

The invention then proposes that the device of the user performs the biometric recognition of the other user (whose device sends him a public key) and does validate (that is to say, accept) only one or a limited number of public keys transmitted by one same other user. During each transmission, to the device of the user, of a public key, by another user, the biometric data of the latter are stored by the device of the user. Thus, a same other user who retransmits a new public key is recognized (by his biometric data which have already been stored during a previous key transmission). Preferably this recognition by the device of the user is based on a plurality of biometric data of different types (in parallel) in order to tend to ensure that when the user of another device is not recognized, it is actually because it has not yet transmitted any public key to the device of the user.

Thus, the methods described above (points 2) and 3)) for capturing random signals and biometric data on both sides, which was simply intended to protect the device of the user from a MitM attack, is now also used for restricting the number of public keys transmitted by a same other user (based in particular, advantageously, on manufacturers of the devices that provided them) to the device of the user and allows him to thus protect himself from a Sybil attack.

1) Neighborhood of a Node

In addition to its own public key(s) and associated attributes, each device may transmit to another device during a pairing the associated keys and attributes that it has itself received from third parties. Thus, each device transmits to the other device:

the public keys and associated attributes that this device itself has received from third-party devices (level 1 neighborhood);

the public keys and associated attributes that third-party devices have received from still other devices (level 2 neighborhood);

and so on (level n neighborhood).

Since the user of the first device is not always sure that the user of the second device has himself played the game correctly for his neighborhood (and vice versa), a Sybil attack remains possible. In other words, for the first device, the risk of a Sybil attack is limited when it executes the method described above (to receive public keys from other direct users—level n=0), but the risk that the user of the second device does not apply this process for keys that it would itself have received from third parties (i.e. his neighborhood—level n>0) fully remains.

This risk is mitigated by the above-described pairing processes, because at each level of the neighborhood (the other indirect users being therefore included), the device of each other user who propagates thereto the keys (by keys it is meant here public keys/associated addresses and attributes) guarantees "by construction" that the pairing process described above (including biometric recognition and aiming to accept only a restricted number of keys transmitted by a same other user) is well executed.

Note that the fact that the attributes include canonical forms of biometric data allows each node to require a limited number of keys in the whole neighborhood (not only at the zero level but at all levels). Indeed, the same user who would provide different keys to different devices would have the same biometric attributes for these keys, which would allow a node not to accept these additional keys from the same user when they appear in a neighborhood.

This aspect thus allows the devices in question to be trusted in that they each possess a secret private key (accessible by the device alone) enabling it to provide a certificate of the treatments carried out and the integrity of these treatments (by providing the hash code executed—see the aforementioned documents), and automatically sign the data they provide (with their respective secret keys), the public signature key (to decrypt the signature) being itself signed (certified) by the manufacturer of the device, and that with each public key previously transmitted by another device is also transmitted the signature of the latter and the identity (the public key) of its manufacturer—a device that receives the neighborhood of another device and information from the manufacturer of this other device can verify that the process in question has been executed during their transmission. (The WNDs described in the aforementioned PCT applications can thus play the role of such devices).

Thus, the neighborhood transmitted to the device of the user by another device includes not only the public keys (of different levels) that the neighborhood includes, but also the signatures of these public keys by the devices that provided them and their respective certificates (i.e. the signatures, by the respective manufacturers, of the public keys allowing to decrypt said signatures by the devices) which guarantee that it is indeed the process (of biometric recognition with captured codes, making it possible to mitigate the MitM and Sybil attacks) described above that has been executed.

IV—Sensor Block

Here it is proposed an additional security for data processing systems, more particularly systems on a chip (SoC).

Known attacks against data processing systems include different kinds of Fault Attack, such as varying the clock rate or sending photons to the transistors to derive information from them.

As already mentioned, the PUFs (physical unclonable function) are security mechanisms based on permanent physical phenomena at the time of Power On the system. However, a "power supply attack" is possible: when sensitive information such as a cryptographic key is in memory, and the power is cut before it is erased, there are ways to detect it.

It is proposed here to implement a detection of such attacks in the chip itself, by means of sensors for temperature, light, voltage, clock frequency, etc., which must "continuously" notify the proper operation of the chip. Thus the messages issued by the chip are valid only on proof, issued by an authority, which advantageously can be decentralized, of non-detection of an attack, this proof being generated on the basis of the non-interruption of the flow of these notifications.

1) General Framework

A SoC chip incorporates a "Wallet Node" (WN) described in application WO2016120826A2 or WO20171221287A2, incorporating a secret private key.

A manufacturer of the chip, on behalf of an authority, signs the public key of the WN (or an address derived therefrom).

Each message sent by the chip ("Wallet Message" WM) includes the hash of the WP program to be executed by the recipient WN, this hash being denoted #WP.

2) Detection Blocks

Figure 5:
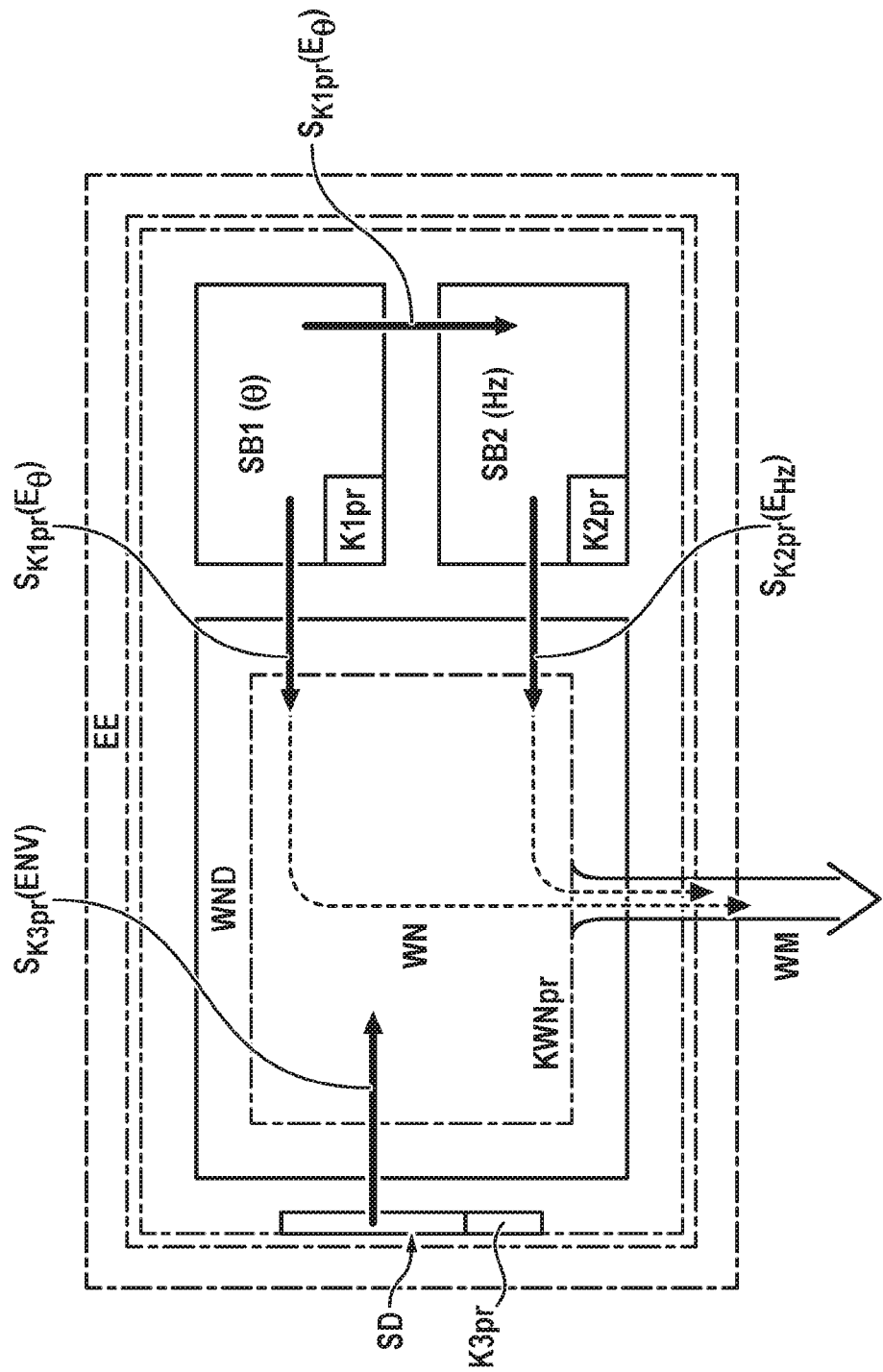
FIG. 5 is a block diagram of an entity involving a secure processing circuit and detection blocks.

With reference to FIG. 5, a plurality of sensor blocks, here SB1 and SB, monitor operating parameters of the secure processing circuit to be monitored, here a WND in the form of a SoC implementing a WN, and also control each other and generate reports (and Logs) of good functioning or alert sent to entities that are under the supervision of the authority controlling the dissemination of the SoCs.

Here, the detection block SB1 monitors the temperature of the circuit, and generates a temperature status signal Ee that it signs with a secret key K1pr inaccessible from outside, typically the private key of a public/private key pair, this status signature being communicated to the WND circuit. The detection block SB2 monitors the clock frequency of the circuit, and generates a clock status signal EHZ that it signs with a secret key K2pfr inaccessible from outside, this status signature being communicated to the WND circuit.

Preferably, each detection block also monitors the status of the other detection block by receiving the status signature thereof, and is also capable of generating and signaling an abnormal status to the WND in the event of a fault (typically absence of status signature, or incorrect status signature (abnormality)).

In parallel, an SD envelope detection structure having its own secret key K3pr monitors an integrity status ENV of an external envelope EE and supplies the circuit WND with a signature of this integrity status.

Each SB is advantageously implemented in a combination of different technologies, so that the attacker cannot hack more than one SB at a time in a given time interval.

For example, one of the SBs is made in MCML technology (MOS Current Mode Logic) while one is made in CMOS technology, possibly with random jitter on the clock signals to add noise against side attacks (see for example US2011285421A1, US2011285420A1 or US2011260749A1 and citing or cited documents).

In general, each block SB can monitor at least one parameter among, for example, the temperature, the light, the voltage, the clock frequency of the circuit.

SBs regularly send signed notifications to entities that are under the supervision of the authority. These notifications can be safe operation reports signed by each SB, and/or logs of these reports. Logs notification (chronological succession of reports) makes it possible to send notifications less frequently and thus to tolerate temporary non-availability of means of communication between the WN and the recipient entity.

3) Sequencing

Periodically, each SB of a WN generates its report (of safe operation or of alert in case of malfunction), signs it with his private key stored in the SB, and notifies this report to the other SB (or to each other SB) of the same WN. In the case of several SBs, this transmission can be made one-to-one or in a circular manner via the vicinity.

A second SB to which a first SB has notified a report can for example countersign it (in case it confirms it), adds it to its log and returns it to the first SB (or in a circular manner, via the vicinity until reaching the first SB).

Said first SB then replaces in the log the report that it had recorded with his signature alone and originally transmitted.

Periodically (or as soon as possible) the logs are sent to said entities under the supervision of the authority, by being incorporated into Wallet Messages WM.

Said entities return (signed) certificates of safe operation covering a certain time interval in the future for a given WN (identified by its public key or an address derived therefrom, itself certified by a manufacturer under the supervision of a authority as mentioned at the beginning).

Each issued WM message is valid only if it contains such a safe operation certificate, and only during the time interval given in this certificate.

According to one variant, a WN can request a safe operation certificate when it has to send a particular WM.

Advantageously, the entities that are under the supervision of an authority are delegate entities (delegated by the authority in question) and thus form a plurality of delegate entities capable of certifying the WNs. In a safe operation certificate, the delegate entity communicates the signature, by the authority, of its own public key (the latter making it possible to decrypt its certificate).

According to another variant, the WNs connected in a network can play the role of said entities, thus offering a p2p solution for mutual control (in network) of the WNs.

Finally, the fact of separating the detection blocks SB from the Wallet Node part WN in the SoC chip is advantageous for preserving the performance of the WN.

V—3-Level Protocol

1) General Principle

The different approaches described in this specification can be combined.

First, the envelope signature is initially communicated by a device to its mirror devices (typically the mirror WNDs for the WN executed in the case of an implementation according to WO2016120826A2 and/or WO2017122187A2), and these devices mutually verify their envelope signature.

In addition, these mirror devices mutually check their ES envelope signatures at each interaction.

More precisely, the current ES and the different logs (ES log, sensor block log, etc.) of a given device are transmitted with each message (such as WM) transmitted, and thus communicated to the recipient device.

A mirror device is therefore capable of verifying the log and also verify the current ES accompanying the WM by comparing it with the initially received ES.

The 3-level protocol is as follows:
if the verification at the current ES fails, then from that moment all WMs provided by this WND are considered invalid and the device implementing this WND) is blacklisted;
if the logs (Sensor Blocks, BIST (Built-In Self Test typically used to test the secret key of a SoC), etc.) show that the WND has been tampered, then the WND is blacklisted;
if the ES verification and log verification show that the WND has never been tampered, but the mirror outputs show an inconsistency with the WND outputs, then the manufacturer of the WND at stake is blacklisted.

The fact that a WND or a manufacturer of WND is blacklisted is propagated in the network via the vicinity (from node to node) by an appropriate propagation mechanism based for example on dedicated WMs.

2) Weighting Mirrors by Manufacturers

When establishing a set of mirrors, other devices are selected as mirrors by a given device according to their respective manufacturers. The manufacturers are weighted according to their active users as described in the first part. At each level in the neighborhood, the device aims to maximize the diversity of manufacturers while weighting them. In addition, when parsing the neighborhood in an increasing direction, a device has the objective of maximizing the diversity of the manufacturers of the other devices at each level of the neighborhood, with respect to the manufacturers of the other respective corresponding devices at lower level that had communicated them).

VI—Other Implementations and Combinations

Included by reference in this specification are not only published documents WO2016120826A2, WO2017122187A2 and US2017091750A1, but also unpublished application U.S. 62/400,174 filed on Sep. 27, 2016 and U.S. 62/462,390 filed Feb. 23, 2017, all in the name of the present applicant.

VII—Applications

1) Secure Transactions

Transfer transactions of units of account, such as cryptocurrencies, or commitments transactions such as risk coverage commitments (see documents WO2016120826A2, WO2017122187A2 or US2017091750A1 in the name of the Applicant).

2) Transactions Involving Interactions with the Physical World

In general, smart contracts based on a blockchain are limited to the implementation of logical operations, as only these can be replicated on different machines (miners/validators) to ensure the reliability of the system.

The inventions described here, by allowing trusted environments to cooperate with sensors and/or actuators without compromising this trust, make it possible to exploit smart contracts that will be able during their execution to generate control signals to actuators (locks, etc.) and/or to take as input signals provided by secure sensors, thus extending the universe of smart contracts to the entire economic chain (production, delivery of goods or services), while the state of the art in the field of smart contracts, based on a blockchain is limited to transactions of units of account, authentication, etc.

3) Authentic and Time-Stamped Photos, Videos or Sound Captures

The aim here is to prove a litigious state of affairs in the real world by providing a time-stamped and geolocated photo of it, also proving that the means to generate this photo—in this case the camera and GPS components—have not been replaced or displaced (relative to the position of the WND), which amounts to providing evidence that the envelope of the device has remained intact.

4) Opening a Service and Payment

A smart contract here makes it possible to trigger a payment when a lock opens, which is detected by a secure sensor component within a secure processing circuit which here is part of the lock in question. The inventions described herein allow to provide evidence that the lock position sensor component in question has not been replaced or displaced, for example by the envelope signature mechanism.

The invention claimed is:

1. A secure entity in a local trusted execution hardware environment (TEE) comprising:
a secure processing circuit suitable for implementing a contract execution architecture consisting of a Wallet node capable of executing a contract-type Wallet Program, said Wallet Program being able to be loaded into an execution memory in response to a program identifier contained in a Wallet Message that reaches the entity via a channel for communication with other entities,
wherein users are able to trust each other as to the results of execution of their respective Wallet Nodes, each Wallet Node comprising a processor and the execution memory,
wherein two Wallet Nodes can interact with each other only by Wallet Messages each containing a hash of the Wallet Program whose execution has generated the Wallet Message at an origin of the same Wallet Program that is executed upon reception of the Wallet Message at a destination; and
a secure device configured for physical interaction with a physical environment of the entity, said secure device comprising a sensor module, which is adapted to supply input data to the secure processing circuit from at least one physical sensor for the execution of the contract and receive from the secure processing circuit control signals for at least one physical actuator generated by the execution of the contract, said secure device containing its own secret key for securing exchanges with said secure processing circuit when said contract-type program is executed.

2. The secure entity of claim 1, further comprising at least one detector device capable of detecting a normal/abnormal status of an environment parameter of the secure processing circuit and generating at least one corresponding normal/abnormal status data, each detector device comprising a secret private detector device key for signing normal/abnormal status information generated by said detector device, said secure processing circuit being able to transmit messages containing, on the one hand, message content signed with a private key of said secure processing circuit, and on the other hand, said at least one normal/abnormal status data signed with said secret private detector device key.

3. The secure entity of claim 2, comprising at least two detector devices capable of detecting the normal/abnormal status of at least two different environment parameters of said secure processing circuit and of generating respective normal/abnormal status data, each detector device being configured to receive the normal/abnormal status data signed by at least one other detector device and comprising a processor configured to verify said signed data.

4. The secure entity of claim 3, wherein a processor of a given detector device is configured to generate normal/abnormal status data of at least one other detector device, signed with the private key of said given detector device.

5. The secure entity of claim 2, wherein a lack of status information to be supplied by the secure device corresponds to an abnormal status of said secure device.

6. The secure entity of claim 2, wherein each environment parameter is chosen from a group comprising the operating parameters of the secure processing circuit and the integrity of an envelope surrounding the secure processing circuit.

7. The secure entity of claim 6, comprising at least two detector devices with a first detector device for detecting an operating parameter of said secure processing circuit and a second detector device configured to detect the integrity of an envelope of said secure entity, wherein said envelope also surrounds said second detector device for said operating parameter.

8. The secure entity of claim 2, configured to periodically generate said signed normal/abnormal status data and send said status data to at least one verifying device and in order to verify the continuity of a normal status, the secure processing circuit being able to store the status data locally in order to address any unavailability of a remote communication means between said secure processing circuit and said verifying device and to send the verifying device a set of missing signed status information once the remote communication means is reestablished.

9. The secure entity of claim 8, wherein said at least one verifying device is a device controlled by a central authority.

10. The secure entity of claim 8, wherein said at least one verifying device comprises a set of verifying devices formed by circuits implementing mirrors with respect to the secure processing circuit.

11. The secure entity of claim 2, further comprising a circuit for disabling said secure processing circuit in case of detection of an abnormal status.

12. The secure entity of claim 1, comprising a detector device capable of detecting the normal/abnormal status of the integrity of an envelope surrounding said secure processing circuit, wherein said envelope also surrounds said secure device.

13. The secure entity of claim 1, further comprising a normal/abnormal status detector device of the secure device.

14. The secure entity of claim 1, comprising at least two envelopes respectively surrounding at least two separate units of the secure entity, and in one of the units, a normal/abnormal status detector of the integrity of the envelope of another unit.

15. A method for securing exchanges between entities in a peer-to-peer (P2P) architecture consisting of a Wallet node capable of executing a contract-type Wallet Program, said Wallet Program being able to be loaded into an execution memory in response to a program identifier contained in a Wallet Message that reaches the entity via a channel for communication with other entities, each entity comprising a secure processing circuit and at least one detector device capable of detecting a normal/abnormal status of an environment parameter of the secure processing circuit and generating at least one corresponding normal/abnormal status data, each detector device comprising a secret private key detector device for signing normal/abnormal status information generated by the detector device, the secure processing circuit being able to transmit messages containing, on the one hand, message content signed with a private key of the secure processing circuit, and on the other hand, the at least one normal/abnormal status data signed with secret private detector device key, wherein users are able to trust each other as to the results of execution of their respective Wallet Nodes, each Wallet Node comprising a processor and the execution memory, wherein two Wallet Nodes can interact with each other only by Wallet Messages each containing a hash of the Wallet Program whose execution has generated the Wallet Message at an origin of the same Wallet Program that is executed upon reception of the Wallet Message at a destination, and wherein each secure processing circuit receives input from the detector device and can output signals for controlling at least one physical actuator.

* * * * *